United States Patent
Yajima

(10) Patent No.: US 10,036,525 B2
(45) Date of Patent: Jul. 31, 2018

(54) VEHICLE LIGHTING UNIT

(71) Applicant: Stanley Electric Co., Ltd., Tokyo (JP)

(72) Inventor: Toshihiko Yajima, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 180 days.

(21) Appl. No.: 14/834,859

(22) Filed: Aug. 25, 2015

(65) Prior Publication Data

US 2016/0053958 A1   Feb. 25, 2016

(30) Foreign Application Priority Data

Aug. 25, 2014  (JP) .................................. 2014-169992

(51) Int. Cl.
| | |
|---|---|
| *F21V 9/00* | (2018.01) |
| *F21S 8/10* | (2006.01) |
| *B60Q 1/00* | (2006.01) |
| *F21S 43/14* | (2018.01) |
| *F21S 43/20* | (2018.01) |
| *F21S 43/237* | (2018.01) |
| *F21S 43/245* | (2018.01) |

(Continued)

(52) U.S. Cl.
CPC .......... *F21S 48/215* (2013.01); *B60Q 1/0041* (2013.01); *F21S 43/14* (2018.01); *F21S 43/237* (2018.01); *F21S 43/245* (2018.01); *F21S 43/247* (2018.01); *F21S 43/26* (2018.01); *F21S 43/30* (2018.01); *F21S 43/40* (2018.01)

(58) Field of Classification Search
CPC ... B60Q 3/62; B60Q 3/64; B60Q 3/66; B60Q 3/72

USPC .......................................................... 362/511
See application file for complete search history.

(56) References Cited

U.S. PATENT DOCUMENTS 9,134,474 B2 * 9/2015 Lindsay .............. F21S 48/1208
9,623,796 B2 * 4/2017 Takahashi ............ B60Q 1/2665
(Continued)

FOREIGN PATENT DOCUMENTS

| JP | 2011-198536 A | 10/2011 |
|---|---|---|
| JP | 2013-161697 A | 8/2013 |
| JP | 2013-191412 A | 9/2013 |

OTHER PUBLICATIONS

Japanese Office Action for the related Japanese Patent Application No. 2014-169992 dated Apr. 11, 2018.

*Primary Examiner* — Anh Mai
*Assistant Examiner* — Matthew Peerce
(74) *Attorney, Agent, or Firm* — Kenealy Vaidya LLP

(57) ABSTRACT

A vehicle lighting unit can prevent the appearance from deteriorating due to darkened portion even when a light guiding member is disposed in an area where the light guiding member cannot be seen from outside. The vehicle lighting unit can include a light source, and a light guiding member having a light guiding main body and configured to receive light emitted from the light source and guide the light while reflecting the light so that the light exits through the light guiding member, which are contained in a lighting chamber defined by a housing and an outer lens covering the opening of the housing. The light guiding member can include a fin-shaped light emitting portion extending from the light guiding main body and disposed in an area corresponding to an angular range through which the light guiding main body of the light guiding member cannot be seen directly from outside.

10 Claims, 3 Drawing Sheets

(51) Int. Cl.
  *F21S 43/247* (2018.01)
  *F21S 43/30* (2018.01)
  *F21S 43/40* (2018.01)

(56) References Cited

U.S. PATENT DOCUMENTS

| | | | | |
|---|---|---|---|---|
| 2011/0058385 | A1* | 3/2011 | Kazaoka | B60Q 1/2665 362/540 |
| 2013/0094233 | A1* | 4/2013 | Ukai | B60Q 3/51 362/511 |
| 2015/0003093 | A1* | 1/2015 | Omura | B60Q 3/51 362/511 |
| 2016/0102834 | A1* | 4/2016 | Yamada | G02B 6/0061 362/511 |

\* cited by examiner

VEHICLE FRONT SIDE

VEHICLE FRONT SIDE

VEHICLE LIGHTING UNIT

This application claims the priority benefit under 35 U.S.C. § 119 of Japanese Patent Application No. 2014-169992 filed on Aug. 25, 2014, which is hereby incorporated in its entirety by reference.

TECHNICAL FIELD

The presently disclosed subject matter relates to a vehicle lighting unit that causes a light guiding member to be illuminated with light emitted from a light emitting element.

BACKGROUND ART

A combination headlamp to be disposed in a front portion of a vehicle body on either side has been known to include a plurality of types of lamps having different functions within a lighting chamber, which is defined by a housing and an outer lens that covers the opening of the housing. Such lamps having different functions may include a high beam headlamp, a low beam headlamp, a turn indicator lamp, a position lamp, and the like.

Such a combination headlamp is demanded to be reduced in size. In order to do so, some combination headlamps have been configured to employ a light emitting element such as a light emitting diode (LED) as at least one of the plurality of types of lamps, for example, as a light source for a position lamp. In these lamps, further employed is a light guiding member that is configured to guide light emitted from the light emitting element to be illuminated with the light, as if the light guiding member itself can emit light. This type of lighting unit can be found in a publication of Japanese Patent Application Laid-Open Nos. 2013-161697 and 2013-191412.

FIG. 1 shows a partial cross-sectional view of a conventional vehicle lighting unit having such a light guiding member 104 and extensions 105 and 106 between which the light guiding member 104 is surrounded. Specifically, the light guiding member 104 including a light guiding main body is disposed at a deeper position in a space surrounded by the extensions 105 and 106. In this configuration, the light guiding main body of the light guiding member 104 cannot be seen directly from outside within the illustrated angular range θ, and thus, the portion through which the light guiding main body of the light guiding member 104 cannot be directly seen may be darkened, thereby resulting in deteriorated appearance as a whole vehicle lighting unit.

SUMMARY

The presently disclosed subject matter was devised in view of these and other problems and features in association with the conventional art. According to an aspect of the presently disclosed subject matter, a vehicle lighting unit can prevent the appearance from deteriorating due to presence of darkened portion even when a light guiding member including a light guiding main body is disposed in an area where the light guiding main body of the light guiding member cannot be seen from outside.

According to another aspect of the presently disclosed subject matter, a vehicle lighting unit can include a housing having an opening; an outer lens that can cover the opening of the housing to define a lighting chamber together with the housing; a light emitting element serving as a light source; and a light guiding member having a light guiding main body and configured to receive light emitted from the light emitting element and guide the light while reflecting the light so that the light exits through the light guiding member, the lighting chamber containing the light emitting element and the light guiding member. In the vehicle lighting unit, the light guiding member can be configured to further include a fin-shaped light emitting portion extending from the light guiding main body and disposed in an area corresponding to an angular range through which the light guiding main body of the light guiding member cannot be seen directly from outside.

According to the presently disclosed subject matter, the provision of the fin-shaped light emitting portion to the light guiding main body of the light guiding member at a position in an angular range where the light guiding main body of the light guiding member cannot be seen from outside can emit light to prevent the appearance of the vehicle lighting unit from deteriorating due to the presence of darkened portion that cannot be seen as if illuminated with light. The fin-shaped light emitting portion extended from the light guiding main body of the light guiding member that cannot directly be seen can compensate the darkened portion with light to eliminate any outer portion that cannot be seen as if illuminated with light.

The vehicle lighting unit with the above configuration can further include extensions configured to conceal the light guiding main body of the vehicle lighting unit that is not to be seen from outside, and the light guiding main body of the light guiding member can be disposed at a deeper position in a space surrounded by the extensions, and the fin-shaped light emitting portion of the light guiding member extending from the light guiding main body can be disposed at a shallower position in the space. With this configuration, any unwanted portions can be concealed by the extensions while any darkened portions due to the extensions can be prevented by the provision of the fin-shaped light emitting portion at the shallower position than the light guiding main body of the light guiding member.

The above vehicle lighting unit can be further configured such that the light guiding member is configured to include a rod-shaped light guiding main body serving as the light guiding main body and the fin-shaped light emitting portion, and the fin-shaped light emitting portion has a thickness in a horizontal cross section smaller than that of the rod-shaped light guiding main body. With this configuration, the rod-shaped light guiding main body can efficiently guide the light from the light source side to the side where the fin-shaped light emitting portion is provided while the thinner fin-shaped light emitting portion extending from the rod-shaped light guiding main body can efficiently guide and project the light from the rod-shaped light guiding main body to the outside. This can further efficiently eliminate any darkened portion.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to a vehicle lighting unit of the presently disclosed subject matter with reference to the accompanying drawings in accordance with exemplary embodiments.

Figure 1:
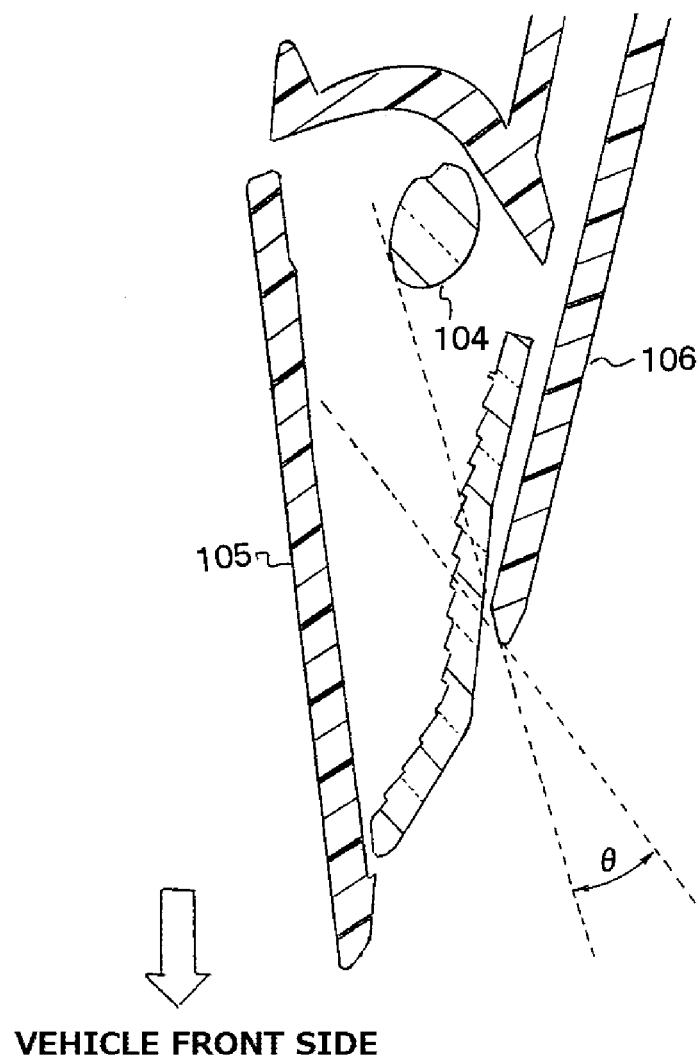
FIG. 1 is a partial cross-sectional view illustrating a conventional vehicle lighting unit taken like FIG. 4, showing a light guiding main body of a light guiding member.
Figure 2:
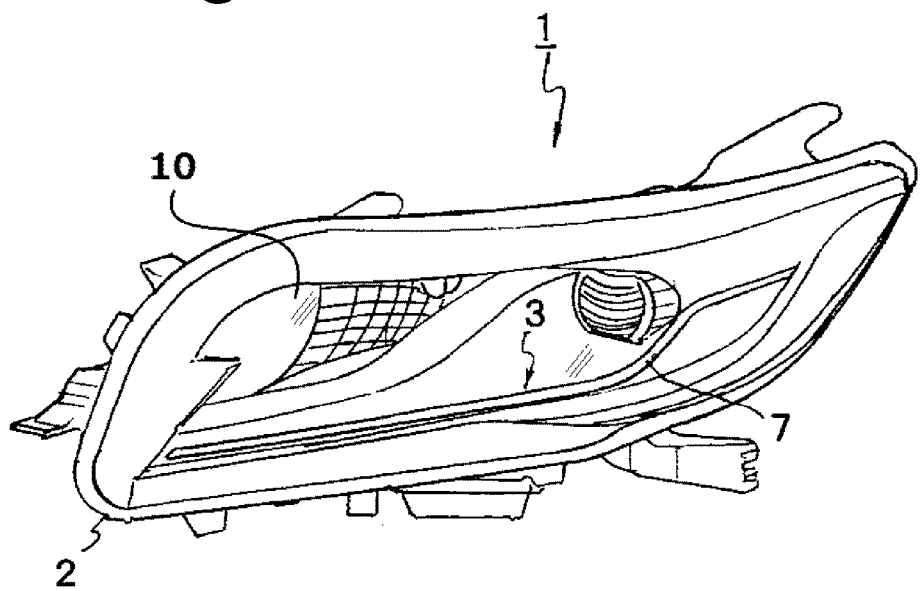
FIG. 2 is a perspective view of a combination head lamp as an exemplary embodiment of a vehicle lighting unit made in accordance with principle of the presently disclosed subject matter.
Figure 3:
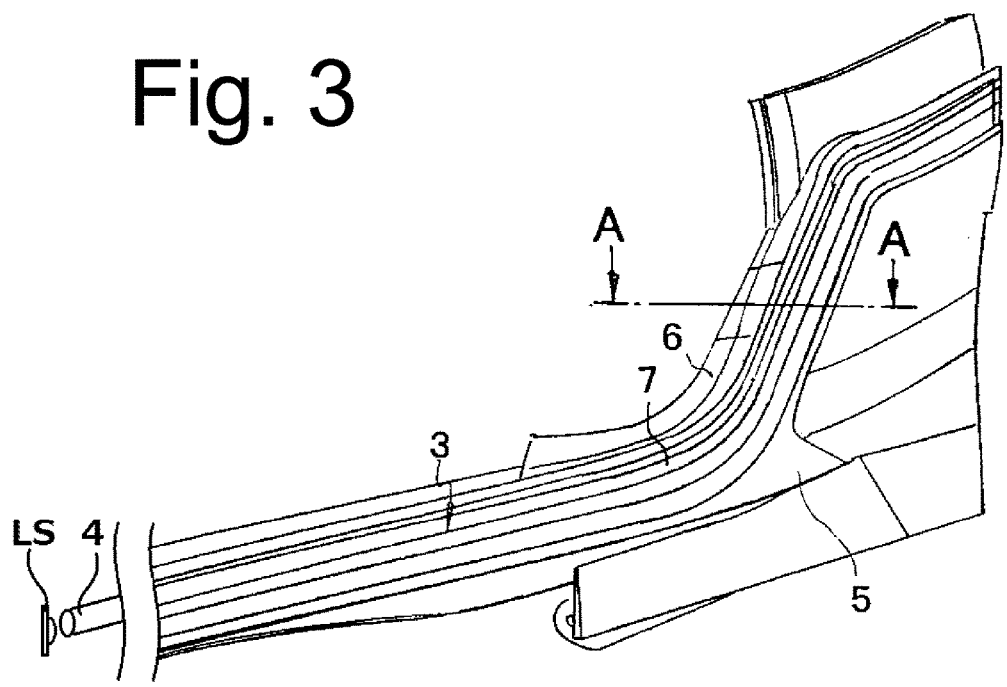
FIG. 3 is a perspective view of essential parts of the vehicle lighting unit of FIG. 2.
Figure 4:
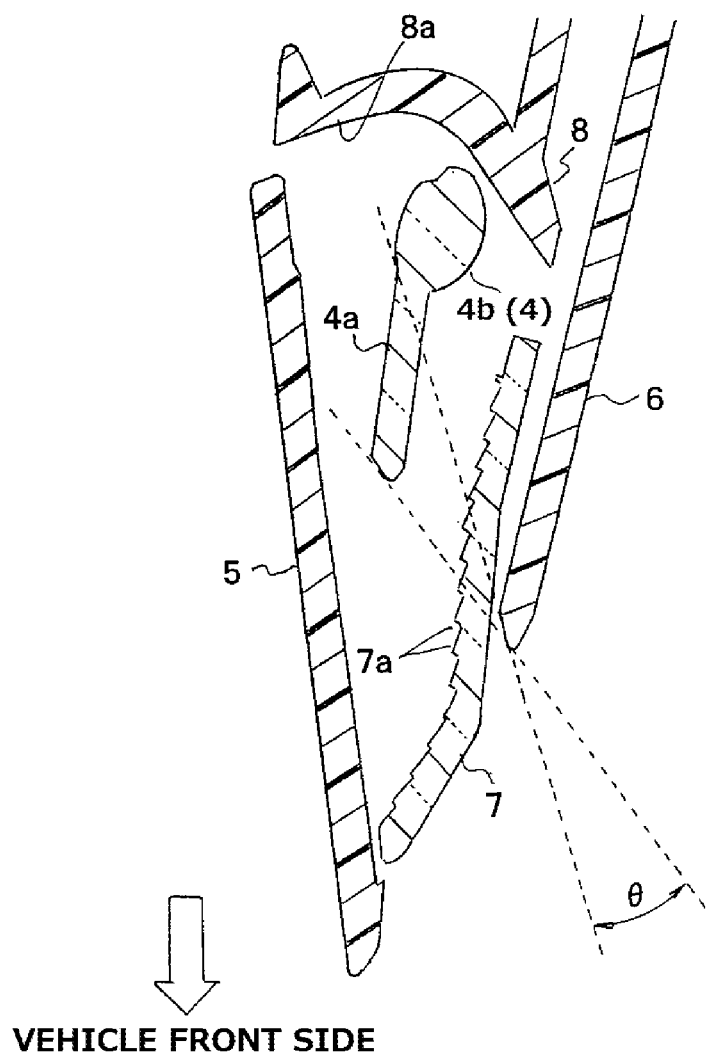
FIG. 4 is a cross-sectional view taken along line A-A in FIG. 3, showing a light guiding main body and a fin-shaped light emitting portion of a light guiding member.

FIG. 2 is a perspective view illustrating a vehicle lighting unit made in accordance with principle of the presently disclosed subject matter, FIG. 3 is a perspective view of essential parts of the vehicle lighting unit of FIG. 2, and FIG. 4 is a cross-sectional view taken along line A-A in FIG. 3.

The vehicle lighting unit 1 of the present exemplary embodiment can be a combination headlamp to be disposed in a front portion of a vehicle body on either side and configured to include a plurality of types of lamps having different functions within a lighting chamber defined by a housing 2 and an outer lens 10 that covers an opening of the housing 2. Such lamps having different functions may include a high beam headlamp, a low beam headlamp, a turn indicator lamp, a position lamp, and the like. In the illustrated vehicle lighting unit 1, reference numeral 3 denotes a position lamp.

In general, an automobile can include front-side lamps with the same basic structure on respective right and left side of the front portion of a vehicle body. Thus, in the following description, only a front-side combination lamp on the left side will be illustrated and discussed.

In the illustrated exemplary embodiment, the position lamp 3 can employ a LED LS as a light source and also a light guiding member 4 configured to receive the light emitted from the LED LS and guide the same therethrough while reflecting the same by the inner surface thereof. The guided light can illuminate the light guiding member 4 and can exit through the light guiding member 4, as if the light guiding member itself can emit light. As illustrated in FIG. 4, the light guiding member 4 can be configured to include a light guiding main body 4b to be disposed at a deeper position in a space surrounded by left and right extensions 5 and 6. The extensions 5 and 6 can conceal portions of the vehicle lighting unit 1 that are not to be seen from outside, and in the exemplary embodiment, can surround the light guiding main body 4b of the light guiding member 4 at its deeper position.

The light guiding member 4 can be formed from a transparent resin, such as an acrylic resin, a polycarbonate resin, etc. The light guiding member 4 can include an end face on the inner side of the vehicle closer to its center, with the end face serving as a light incident surface. The not-illustrated LED can face to the light incident surface, so that the light emitted from the LED can enter the light guiding member 4 to be guided along the light guiding member 4 to the portion (light guiding main body 4b, etc.) of the light guiding member 4 illustrated in FIG. 4.

Furthermore, a transparent inner lens 7 can be disposed along the light guiding member 4 to cover an opening defined by the extensions 5 and 6 on the right and left sides of the light guiding member 4 in a light exiting direction (forward), and can be provided with a plurality of lens cuts 7a formed on its inner surface for controlling light distribution. The vehicle lighting unit 1 can further include a reflector 8. The reflector 8 can be disposed behind the light guiding member 4 (upper side in FIG. 4) and have an recessed inner surface 8a serving as a reflecting surface with aluminum deposition or the like so that the reflector 8 can reflect the light exiting rearward from the light guiding main body 4b of the light guiding member 4 forward.

As illustrated in FIG. 2 (though it includes only the inner lens 7 appearing outside), the light guiding member 4 of the position lamp 3 and the inner lens 7 configured to cover the front face of the light guiding member 4 can linearly extend obliquely and slightly upward from the side of the vehicle front portion closer to the center to the widthwise end side of the vehicle front portion, and then can extend upward and further obliquely upward toward the widthwise end side of the vehicle front portion (see also FIG. 3).

As described above, in the vehicle lighting unit 1 in the present exemplary embodiment as illustrated in FIG. 4, the light guiding main body 4b of the light guiding member 4 provided to the position lamp 3 can be disposed at the deeper position in the space surrounded by the extensions 5 and 6. In this configuration, the light guiding main body 4b of the light guiding member 4 cannot be seen directly from outside within the illustrated angular range θ. The angular range can θ be determined as an angular range where the light guiding main body is concealed by the extension 6 when viewed from its front side, between a straight line connecting the light guiding main body 4b and the tip end of the extension 6 and a straight line connecting a virtual corner of the lighting unit (intersection of extended front line and side line of the vehicle body) and the tip end of the extension 6. Thus, the present exemplary embodiment can adopt a fin-shaped light emitting portion 4a integrally formed with and extending from the light guiding main body 4b of the light guiding member 4 in an area (at a shallower position) corresponding to the angular range θ through which the light guiding main body 4b of the light guiding member 4 cannot be seen directly from outside.

In the position lamp 3 with the above configuration, when a current is supplied to the not-illustrated LED, the light emitted from the LED can be incident on the not-illustrated light incident surface of the light guiding member 4 on the inner side of the vehicle body to enter the light guiding main body 4b of the light guiding member 4. The light having entered the light guiding main body 4b of the light guiding member 4 can travel outward (leftward) through the inside of the light guiding main body 4b of the light guiding member 4 while being totally reflected by the light guiding main body 4b of the light guiding member 4. During the travelling, part of the light can exit the light guiding main body 4b of the light guiding member 4 to be projected forward or be reflected by the rear-side reflecting surface 8a of the reflector 8 to be also projected forward. The projected light can pass through the inner lens 7 disposed in front of the light guiding main body 4b of the light guiding member 4 and the outer lens 10, thereby being projected to a front area in front of the vehicle body. In this manner, the entire light guiding main body 4b of the light guiding member 4 of the position lamp 3 can be illuminated with light as if the light guiding member 4 itself can emit light, and such the position lamp 3 can be recognized by pedestrians or other drivers.

In the position lamp 3 provided to the vehicle lighting unit 1 of the present exemplary embodiment, even when the light guiding main body 4b of the light guiding member 4 is disposed at a deeper position at which the light guiding main body 4b of the light guiding member 4 itself cannot be seen directly from outside, the fin-shaped light emitting portion 4a integrally formed with the light guiding main body 4b of the light guiding member 4 can project light therefrom in the area corresponding to the angular range θ through which the light guiding main body 4b of the light guiding member 4 cannot be seen directly from outside. The provision of the fin-shaped light emitting portion 4a to the light guiding main body 4b of the light guiding member 4 at the position within the angular range θ where the light guiding main body 4b of the light guiding member 4 cannot be seen from outside can emit light to prevent the appearance of the vehicle lighting unit from deteriorating due to the darkened portion that cannot be seen as if illuminated with light. The fin-shaped light emitting portion 4a extended from the directly-unseen light guiding main body 4b of the light guiding member 4 at the deeper position can compensate the darkened portion with light to eliminate any outer portion that cannot be seen as if illuminated with light.

As illustrated, the above-described light guiding main body 4b of the light guiding member 4 can be formed in a rod shape. The rod-shaped light guiding main body 4b can efficiently guide the light from the light source side (LED LS side) to the side where the fin-shaped light emitting portion 4a is provided.

Furthermore, the fin-shaped light emitting portion 4a can have a thickness in a horizontal cross section smaller than that of the rod-shaped light guiding main body 4b as well as can have a surface having been subjected to a diffusion treatment in order to diffuse the exiting light therethrough. The thinner fin-shaped light emitting portion 4a extending from the rod-shaped light guiding main body 4b can efficiently guide and project the light from the rod-shaped light guiding main body 4b to the outside. This can further efficiently eliminate any darkened portion. The degree of thickness of the fin-shaped light emitting portion 4a relative to the rod-shaped light guiding main body 4b is not limited to a particular value, but may be determined in consideration of the manufacturing difficulty and the light guiding efficiency. The too-thin fin-shaped light emitting portion 4a may deteriorate the productivity due to molding difficulty while too-thick fin-shaped light emitting portion 4a may not be easily and properly disposed within the limited space surrounded by the extensions 5 and 6. In the illustrated exemplary embodiment, the fin-shaped light emitting portion 4a may be 40 to 60% the thickness of the rod-shaped light guiding main body 4b.

Although the above exemplary embodiment has dealt with the case where the presently disclosed subject matter is applied to the position lamp of a combination headlamp, the presently disclosed subject matter can be applied to any vehicle lighting units including a light guiding member illuminated with light from a light emitting element such as an LED.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit comprising:
a housing having an opening;
an outer lens configured to cover the opening of the housing to define a lighting chamber together with the housing, and a headlight located within the lighting chamber;
a light emitting element serving as a light source different from the headlight;
a light guiding member having a light guiding main body and an incident end face to which the light emitting element faces and configured to receive light emitted from the light emitting element through the incident end face and guide the light while internally reflecting the light so that the light is emitted from the light guiding member while the light is guided, the lighting chamber containing the light emitting element and the light guiding member, wherein
the light guiding member further includes a fin-shaped light emitting portion extending from the light guiding main body;
a light-shielding member having an opening in an illumination direction in which the vehicle lighting unit emits light, the light-shielding member forming a space in which the light guiding main body is disposed at a position so as to be surrounded by the light-shielding member; and
a reflector disposed behind and along the light guiding member, the reflector being configured to reflect the light emitted rearward from the light guiding member forward in the illumination direction, wherein
the fin-shaped light emitting portion of the light guiding member extends from a side surface of the light guiding main body so that the fin-shaped light emitting portion interrupts direct viewing of the light guiding main body when the opening of the light-shielding member is observed from outside.

2. The vehicle lighting unit according to claim 1, wherein the light-shielding member includes extensions configured to conceal the light guiding main body of the vehicle lighting unit that is not to be seen from outside,
the light guiding main body of the light guiding member is disposed at a first position in the space surrounded by the extensions, and
the fin-shaped light emitting portion is disposed at a second position in the space, wherein the first position is further from the opening than the second position.

3. The vehicle lighting unit according to claim 1, wherein the light guiding member is configured to include a rod-shaped light guiding main body serving as the light guiding main body and the fin-shaped light emitting portion, and
the fin-shaped light emitting portion has a thickness in a horizontal cross section smaller than that of the rod-shaped light guiding main body.

4. The vehicle lighting unit according to claim 2, wherein the light guiding member is configured to include a rod-shaped light guiding main body serving as the light guiding main body and the fin-shaped light emitting portion, and
the fin-shaped light emitting portion has a thickness in a horizontal cross section smaller than that of the rod-shaped light guiding main body.

5. The vehicle lighting unit according to claim 2, wherein the vehicle lighting unit has an opening, and
the light guiding member extends in a longitudinal direction of the opening of the vehicle lighting unit.

6. The vehicle lighting unit according to claim 4, wherein the vehicle lighting unit has an opening, and
the light guiding member extends in a longitudinal direction of the opening of the vehicle lighting unit.

7. The vehicle lighting unit according to claim 5, wherein the light emitting element is an LED.

8. The vehicle lighting unit according to claim 7, wherein the light guiding member has the incident end face at both sides.

9. The vehicle lighting unit according to claim 6, wherein the light emitting element is an LED.

10. The vehicle lighting unit according to claim 9, wherein the light guiding member has the incident end face at both sides.

* * * * *